(12) United States Patent
Ridout et al.

(10) Patent No.: US 9,475,237 B2
(45) Date of Patent: Oct. 25, 2016

(54) CABLE TERMINATION, JOINT AND REPAIR SYSTEM

(71) Applicant: Tyco Electronics UK Ltd, Wiltshire (GB)

(72) Inventors: Keith Ridout, Gloucestershire (GB); Philip Hammond, Wiltshire (GB)

(73) Assignee: Tyco Electronics UK Ltd., Swindon, Wiltshire (GB)

( * ) Notice: Subject to any disclaimer, the term of this patent is extended or adjusted under 35 U.S.C. 154(b) by 933 days.

(21) Appl. No.: 13/706,326

(22) Filed: Dec. 5, 2012

(65) Prior Publication Data

US 2013/0140726 A1 Jun. 6, 2013

(30) Foreign Application Priority Data

Dec. 6, 2011 (GB) .................................. 1120898.0

(51) Int. Cl.
| B29C 73/00 | (2006.01) |
| B29C 73/10 | (2006.01) |
| H02G 1/16 | (2006.01) |
| H02G 15/00 | (2006.01) |
| H02G 15/113 | (2006.01) |
| H02G 15/18 | (2006.01) |

(52) U.S. Cl.
CPC ................ B29C 73/10 (2013.01); H02G 1/16 (2013.01); H02G 15/003 (2013.01); H02G 15/113 (2013.01); H02G 15/18 (2013.01)

(58) Field of Classification Search
CPC .......... B29C 73/10; H02G 1/16; H02G 1/14; H02G 1/145
USPC ...................................... 264/36.22
See application file for complete search history.

(56) References Cited

U.S. PATENT DOCUMENTS 2,312,652 A    3/1943  Komives et al.
5,683,536 A *  11/1997 Kneafsey ................. C08J 5/124
                                                156/327
(Continued)

FOREIGN PATENT DOCUMENTS

GB    467417 A    6/1937
GB   1157436 A    7/1969
(Continued)

OTHER PUBLICATIONS

Search Report issued by the GB Intellectual Property Office, dated May 31, 2012, for related priority Application No. GB 1120898.0; 4 pages.

*Primary Examiner* — Joseph S Del Sole
*Assistant Examiner* — John Robitaille
(74) *Attorney, Agent, or Firm* — Faegre Baker Daniels LLP

(57) ABSTRACT

A system for encapsulating a cable 12 for the purpose of splice closures, breakout closures, jacket repair closures or end capping, in which a casing is fitted around a part of the cable to be sealed, defining within it a cavity surrounding the cable, and a sealant material in the form of a two part acrylic structural adhesive material is injected to fill the cavity and cured in situ. The two part adhesive has a base resin including a methacrylate monomer and a minor part including an oligomeric synthetic rubber and a curative for the monomer, preferably an organoborane accelerator such as an organoborane amine complex, which may be carried by a polyfunctional aziridine. The two parts are preferably mixed at a volume ratio of 2:1 to 15:1.

22 Claims, 5 Drawing Sheets

(56) References Cited

U.S. PATENT DOCUMENTS

| | | | |
|---|---|---|---|
| 6,284,976 B1 * | 9/2001 | Pulido | H02G 15/013 174/74 R |
| 7,407,706 B2 * | 8/2008 | Miyabayashi | B01J 13/14 427/221 |
| 2009/0260736 A1 * | 10/2009 | Charette | B29C 45/14065 156/49 |

FOREIGN PATENT DOCUMENTS

| | | |
|---|---|---|
| GB | 1295091 A | 11/1972 |
| SU | 1376166 A1 | 2/1988 |

* cited by examiner

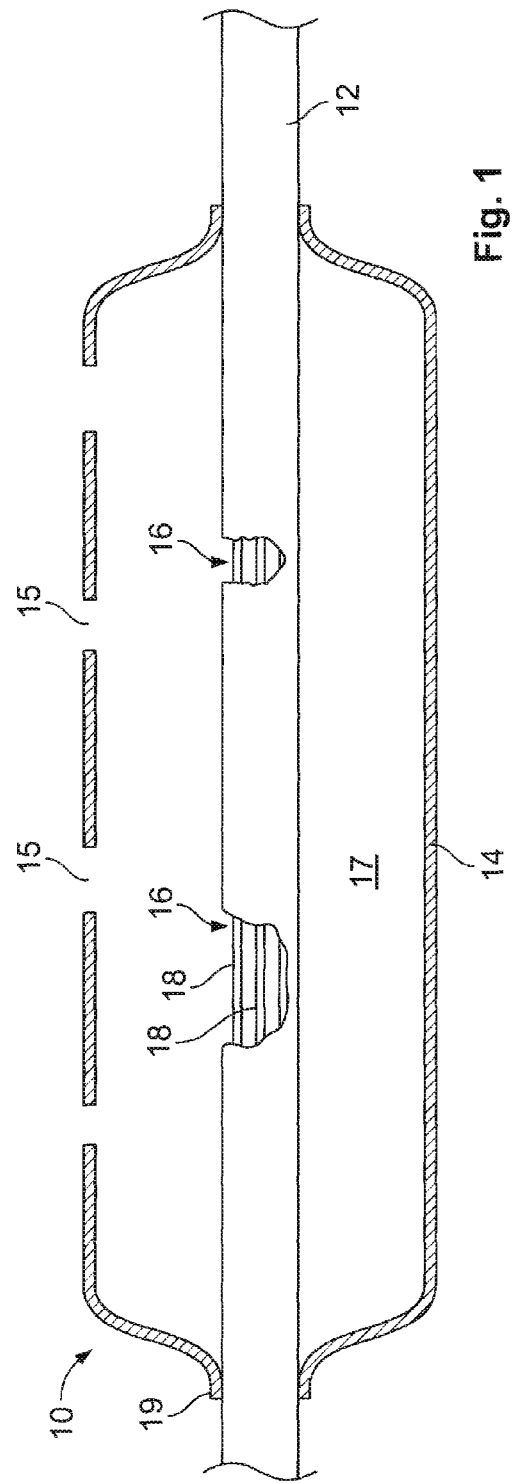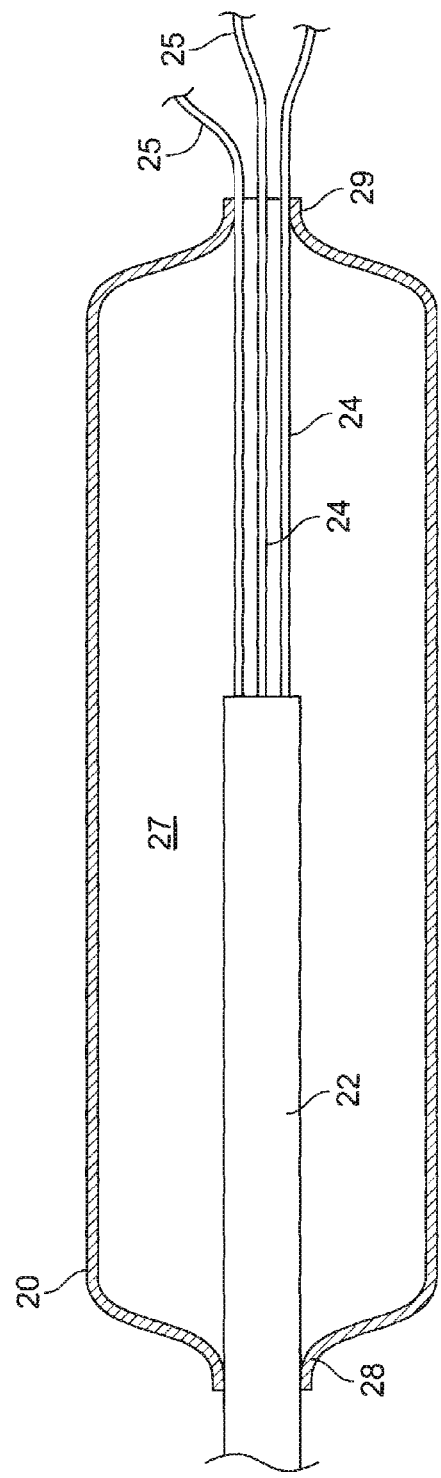

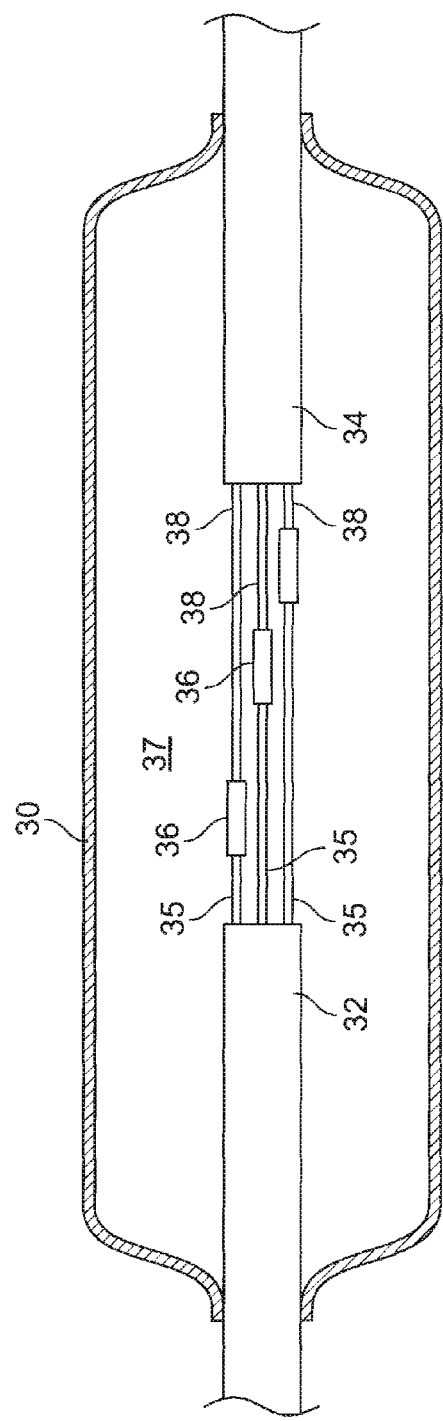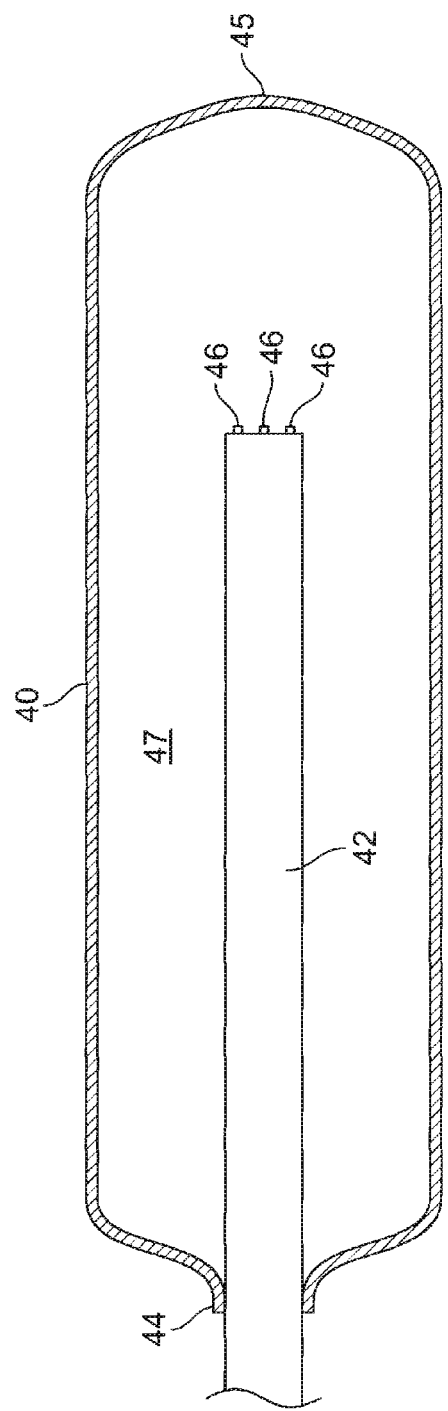

CABLE TERMINATION, JOINT AND REPAIR SYSTEM

This invention relates to a system for repairing, terminating and splicing cables, and in particular deep sea cables, and for encapsulating repairs, splices and cable breakouts, as well as providing end caps for cables.

Existing systems for repairing or sealing underwater cables tend to require substantial heating of sealing materials and the use of custom-made tooling to achieve an effective repair or joint. Most systems are designed and tested only for use at limited depths, up to approximately 300 meters. There is therefore a need for a system that can be used at greater depths, preferably up to 6,000 meters, and does not require heating to high temperatures, long cure times or specialist tooling.

EP-A-0189240 discloses a splice case comprising two-parts hinged together and closable around a substrate such as a wire or cable and defining a housing with an internal cavity surrounding the substrate, the cavity being filled with a gel sealant. The gel is typically of silicone or polyurethane.

It is important in systems of this type to achieve a complete seal around the splice or closure body. One way to achieve this is to use a structural adhesive, but it is difficult to obtain strong adhesion to the surfaces of cables and splice cases, which are typically made of low surface energy materials such as polyolefins, fluorinated polyolefins or silicones. The adhesive must completely "wet" the substrate by coming into intimate contact with its surface. Most high strength adhesives are polar materials and it is very difficult to wet a low surface energy substrate with a polar liquid since the surface energy of such liquids is too high. Insufficient wetting may result in interfacial voids, resulting in a weak bond.

A further problem that arises is that commercial plastics usually contain significant quantities of additives, and in free radical-polymerized materials low molecular weight materials are present as well as high molecular weight polymer. These components tend to be exuded and appear on the surface, resulting in weak boundary layers. Various surface treatments may be necessary to remove such surface contaminants, for example flame treatment, plasma treatment corona discharge treatment, oxidation or sputter etching, which treatments tend also to increase surface energy as well as roughening the surface to enhance adhesion.

U.S. Pat. No. 6,284,976 discloses a cable splice closure having a closure body with mating surfaces sealed together, an opening with an end seal for receiving a cable and a port for the injection of an adhesive to complete the seal. The adhesive is a low surface energy adhesive based on acrylic monomers and a curative comprising an organoborane amine complex.

There remains however a need for improved cable repairing, terminating and splicing systems for underwater applications that can be carried out at ambient temperatures, without the need for complex surface treatments or elaborate tooling, to give seals that can withstand greater depths, for example 500 meters or more and preferably down to 6,000 meters.

The present invention provides a method of repairing or encapsulating a cable, comprising the steps of forming or positioning a casing or enclosure around a part of a cable to be sealed, the casing defining a cavity around said part of the cable, filling the cavity with a two-part structural adhesive composition and allowing said adhesive composition to cure in situ wherein a base resin component of the adhesive composition comprises a methacrylate and a minor part comprises an oligomeric synthetic rubber and cure accelerator for the composition.

While the casing or enclosure will in many cases be left in place around the completed repair, in some cases it can be removed after curing of the encapsulating adhesive.

The two-part adhesive material preferably comprises as a major part a base resin including a methacrylate monomer and as a minor part a curative component including an oligomeric synthetic rubber and a curative and/or cure accelerator, for the resin, preferably an organoborane initiator. The two parts will suitably be mixed at a volume ratio of 2:1 to 15:1, preferably 5:1 to 12:1, and more preferably about 10:1.

The base resin preferably has a viscosity of 10 to 25 Pas. The accelerator component preferably has a viscosity of 20 to 35 Pas, typically about 27 Pas. The methacrylate monomer of the base resin component could suitably be a methacrylic acid ester of a heterocyclic alcohol, preferably tetrahydrofurfuryl methacrylate.

The methacrylate monomer preferably constitutes 40-70 wt % of the base resin component.

The base resin component preferably includes an acrylate polymer, suitably in a minor amount such as 10-30 wt %. Another component that the base resin may contain is a minor amount of a butadiene-styrene polymer, preferably an ABS (acrylonitrile-butadiene-styrene). Again, a suitable quantity to include in the base resin is 10-30 wt %.

The base resin may further include an unsaturated diester, preferably one containing a 1,4 dioxoalkene group such as a 1,4-dioxobutene group. Examples of such compounds include alkyl, aryl and aralkyl diesters of maleic, fumaric and itaconic acids, preferably $C_1$-$C_6$ alkyl diesters of these acids. A preferred compound of this type is dibutyl itaconate. The unsaturated diester may be included in an amount of 5-10 wt %. This part of the composition may also include an aliphatic urethane acrylate, suitably in an amount of 1-5 wt %.

The base resin may include other components such as fillers, for example glass microspheres, which may suitably be included in an amount of 1-5 wt %.

The base resin is in the form of a liquid or paste.

The rubber oligomer may suitably be a vinyl aromatic compound, preferably one having a general formula:

$$R^1_x-A(CR^2=CR^3R^4)_y \qquad \text{I}$$

or

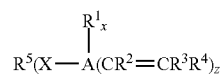

$$\qquad \text{II}$$

wherein A is substituted aromatic ring, preferably of 6 or 10 carbon atoms, $R^1$ is a substituent other than hydrogen or the aromatic ring, $R^2$, $R^3$ and $R^4$ are independently hydrogen, alkyl, aryl or a halogen, $R^5$ is an organic group, preferably an oligomeric organic group, X is a covalent bond or a divalent organic linking group, preferably a urethane or urea functional group, x is 0 or an integer from 1 to 4, y is an integer of 1 or more and z is an integer of one or more, preferably at least 2.

Some compounds of formulae I and II are described in U.S. Pat. No. 6,479,602 and include α-methyl styrene polyureas.

Such compounds can be made for example by reacting an unsaturated aromatic isocyanate such as 3-isopropenyl-α,α-dimethyl benzyl isocyanate with a mono- or polyfunctional amine, alcohol or combination thereof to give a urea function. Suitable alcohol compounds include diethylene glycol, polycoprolactone triol and, most preferably, polypropylene glycol. Preferred amine-functional compounds include amine-terminated polyethers having molecular weights of 400 to 3000.

The rubber oligomer preferably has a molecular weight in a range of 200 to 5,000, more preferably 400 to 2,000.

The curative in the minor component of the adhesive composition is preferably an organoborane initiator, suitably an organoborane-amine complex.

Many organoborane-amine complexes suitable as curatives in the adhesives used in the method of the invention are described in U.S. Pat. No. 6,384,165. The organoborane component is preferably a trialkyl borane, more preferably one in which the alkyl groups have 1 to 5 carbon atoms. Most preferred are triethylborane complexes.

The amine of the complex may suitably be ammonia or a primary or secondary monoamine, or a diamine or polyamine. Preferred primary amines include alkyl amines such as ethylamine, butylamine, hexylamine, octylamine and aralkylamines such as benzylamine. Preferred alkane diamines include 1,2-ethanediamine, 1,3-propanediamine, 1,5-pentanediamine, 1,6-hexanediamine, 1,12-dodocanediamine, 2-methyl-1,5-pentane diamine, 3-methyl-1,5-pentanediamine and isomers of these compounds. Alkyl polyamines that may be used include triethylene tetramine and diethylene triamine. Polyoxyalkylene polyamines may also be used. Polyamines are preferred over monamines.

The ratio of primary nitrogen atoms to boron atoms in the complex is preferably from 1:1 to 4:1, more preferably 1:1 to 2:1 and especially 1:1 to 1.5:1.

An amine-reactive material may be included in the base resin component to liberate the amine from the complex. Suitable amine-reactive compounds including organic acids, aldehydes and anhydrides. Less preferable (but usable) compounds include isocyanates, acid chlorides and sulfonyl chlorides. The complex may be carried or diluted by one or more polyfunctional aziridines.

The amine curative is preferably included in an amount of 2-25 wt % based on the base resin component, more preferably 5-13 wt %. The oligomeric synthetic rubber is preferably included in the curative component in an amount of 40-70 wt %.

The minor component may also include a filler such as amorphous silica in an amount up to 5 wt %.

The curative part of the composition is a liquid, preferably a viscous liquid as indicated above.

An example of a preferred adhesive for use in the method of the invention has the following two-part composition:

|  | Ingredient | Weight % |
| --- | --- | --- |
| Base Resin: | Tetrahydrofurfuryl Methacrylate | 40-70 |
| (About 10 parts) | Acrylate polymer | 10-30 |
|  | ABS Resin | 10-30 |
|  | Dibutyl Itaconate | 5-10 |
|  | Aliphatic urethane acrylate | 1-5 |
|  | Glass microspheres | 1-5 |
| Curative Component: | Oligomeric synthetic rubber | 40-70 |
| (About 1 part) | Polyfunctional Aziridine | 10-30 |
|  | Organoborane amine complex | 5-13 |
|  | Amorphous silica | 1-5 |

One acrylic adhesive that has been found particularly suitable for the purposes of the present invention is 3M Scotch-Weld DP-8010 structural plastic adhesive. This comprises a base part of a methacrylate polymer having a density of 0.95 to 1 kg/l and a viscosity of 17 Pas, and a second part comprising further resin and an amine cure accelerator, this part having a density of 1.05 kg/l to 1.09 kg/l and a viscosity of about 27 Pas. The adhesive composition can be injected and cured at ambient temperature. Mixing at a volume ratio of 10 parts of base resin to 1 part of accelerator gives a resin mixture that can be worked for 10 to 12 minutes. The mixed composition takes 1.5 to 2 hours to reach handling strength (0.35 MPa at 23° C.) and 8 to 24 hours to reach full cure.

The acrylic adhesive composition is preferably injectable, and holes may be provided in the casing fitted around the cable for the injection of adhesive resin.

The preferred resins in accordance with the invention can bond to many low surface energy plastics, including many grades of polypropylene, polyethylene, polyurethanes and thermoplastic polyurethane compositions, without the need for special surface preparation.

The cavity around the cable to accommodate the adhesive may be provided by a heat shrink tube or a side entry closure. The heat shrink tube can be used for example when two cable ends are being joined, since it needs to be slid over a cable end to fit it. A side entry closure can be fitted around an existing cable joint or repair site. In some cases the casing forming the cavity may be removable after curing of the adhesive. Such a temporary casing may be formed for example using a tape or wraparound tube. Tape may be used to seal the ends and the casing may after injection and curing of the adhesive to give a low profile finished cable.

In the case of an undersea cable having a relatively thick sheath, damage to the sheath can be repaired by wrapping a tape around the repair site, injecting the adhesive either between successive tape windings or between jacket and tape and removing the tape after curing of the adhesive to leave a repair that is flush with the cable surface.

The system of the invention can be used with both horizontal and vertical cables, or indeed with cables in any orientation.

Preferred embodiments of the invention will now be described with reference to the accompanying drawings, wherein:

FIG. 1 is a cross sectional view showing how a system of the invention can be used for a cable jacket repair;

FIG. 2 shows the system of the invention used to form a cable breakout enclosure;

FIG. 3 shows the system of the invention used to form a cable splice enclosure;

FIG. 4 shows the use of a system in accordance with the invention to form a cable end cap;

Figure 5:
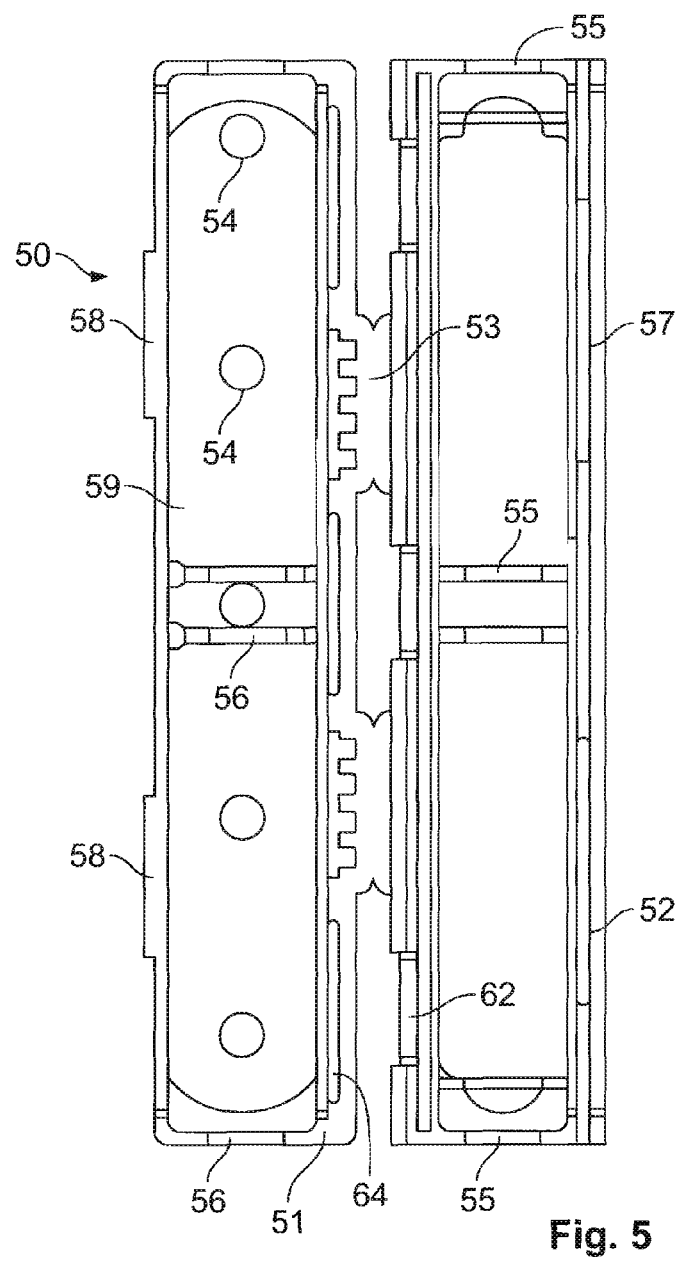
FIG. 5 is a top plan view of a side entry closure for use in the system of the invention, opened up to show the inside of two halves of the closure hingedly connected together.

Referring first to FIG. 1, a cable 12 has its outer sheath damaged at positions generally indicated by 16, exposing wires 18. To repair the damage, a heat shrink tube or other enclosure 14 is fitted around the site, defining a cavity 17.

The enclosure is provided with apertures 15 through which a two part acrylic adhesive is injected, the two parts being mixed just before injection.

The adhesive completely encapsulates the damage sites, separating the individual wires from one another to prevent short circuits or arcing, and cures in situ to give a robust seal. The ends 19 of the enclosure fit tightly around the cable on each side of the repair site to prevent the escape of adhesive prior to curing.

Referring now to FIG. 2, an enclosure that may be similar to that of FIG. 1 is schematically indicated by 20 and is used to enclose a cable breakout. One end 28 of the enclosure fits around the cable and within the cavity 27 defined by the enclosure the cable insulation 22 terminates and individual wires extend to the opposite end 29 of the cavity, emerging at 25 to be connected at different locations. As in the case of FIG. 1, the cavity 27 is filled with a quick-curing acrylic adhesive, surrounding and separating the wires 24.

In the embodiment of FIG. 3 two cable ends 32, 34 are spliced together within a cavity 37 defined within an enclosure 30. Individual wire ends 35, 38 of the two cables are spliced together by crimps 36, spaced axially from one another to prevent short circuits or arcing. The cavity 37 surrounding the splices is filled with two-part acrylic adhesive as in the case of the embodiments described above, sealing off the splices from one another.

In the embodiment of FIG. 4 the enclosure 40 has only one open end 44, the opposite end 45 being closed, and is used to seal a cable termination. The cable end 42 terminates within cavity 47 defined by the enclosure 47, the ends 46 of the cables wires being sealed from one another by the acrylic adhesive of the invention.

Figure 6:
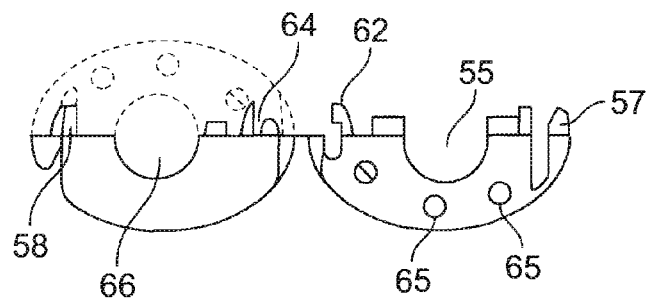
FIG. 6 is an end elevation of the side entry closure of FIG. 5.

FIGS. 5 and 6 show a side entry closure 50 that can be used in the system of the invention. This can be made of any suitable resilient plastics material such as polypropylene and comprises two halves 52, 59 connected together by means of an integrally moulded hinge 53. The enclosure is shown open in FIGS. 5 and 6, to show the internal construction. In the bottom half 52, semicircular apertures 55 are formed in the end walls and in intermediate bulkheads to accommodate cables. These apertures match corresponding semicircular apertures 56 in the end walls and bulkheads in the top half 59.

The top half 59 of the side entry closure is provided with apertures 54 for the injection of acrylic adhesive. Smaller apertures 65 are formed in the end walls, enabling excess adhesive to seep out during filling, to ensure that the enclosure is completely filled, without air bubbles.

FIG. 6 shows in dotted lines the closed configuration of the closure. With the cable end or ends (not shown) in place, the top half is closed over the bottom to define the required cavity. Resilient flanges 57 along the edge of the top half engage corresponding flanges along the opposite edges of the bottom half with a snap fit, and flanges 62 along the edge of the top half adjacent the hinge 53 snap into corresponding channels 64 of the bottom.

The heat shrink casings illustrated in FIGS. 1 to 4 have the advantage of being range-taking and can be applied to different sizes of cable, while the moulded wraparound closure of FIGS. 5 and 6 can be precision-engineered for partial or applications such as connections in confined spaces. Other types of casing are however also envisaged within the scope of the invention, for example a cold-applied flexible tube slid over a joint or repair, its ends fastened to the cable by a tape or tie to form a closure. Simple containers for the adhesive cavity could also be formed for example by two clamshells secured together or by a sheet of plastics or other flexible material wrapped around the site to form a tube. In either of these cases the casing can be secured for example by pressure-sensitive adhesive, tape, tie wrap or spring.

Figure 7A:
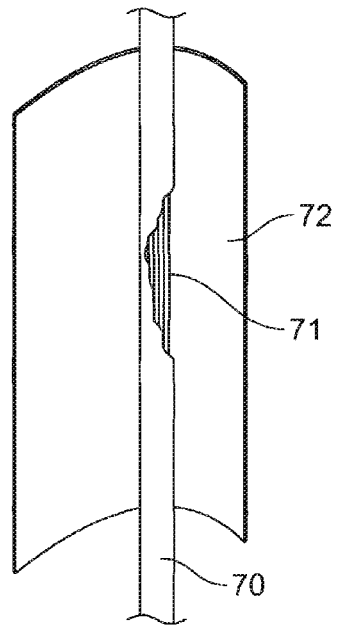
FIGS. 7a to 7d illustrate four stages in the encapsulation of a cable in accordance with a third embodiment of the invention.
Figure 7B:
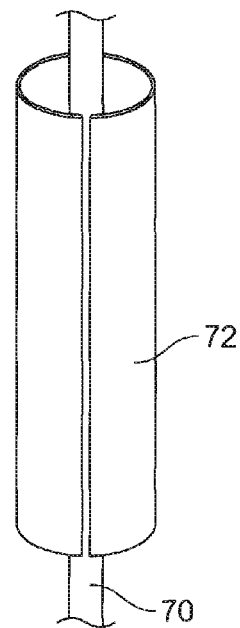

Referring now to FIG. 7, a flexible sheet 72, preferably of a material to which the adhesive used does not bond easily, for example a silicone sheet, is bent to a cylindrical shape around a cable 70, as shown in FIG. 7b, enclosing a damaged area 71 of the cable (see FIG. 7a).

The cylinder is held in place by a spirally winding adhesive tape 74 around it, this tape also being used to seal the ends of the cavity 78 formed around the cable.

An adhesive mixture in accordance with the invention is injected into the cavity, preferably using a mixing gun 75 in which the two components of the adhesive of the invention are mixed in the desired proportion as they are injected. During injection the casing forming the cavity 78 is held substantially coaxially with the cable 72, as shown in FIG. 7c, so that the adhesive wholly surrounds the periphery of the cable.

Figure 7C:
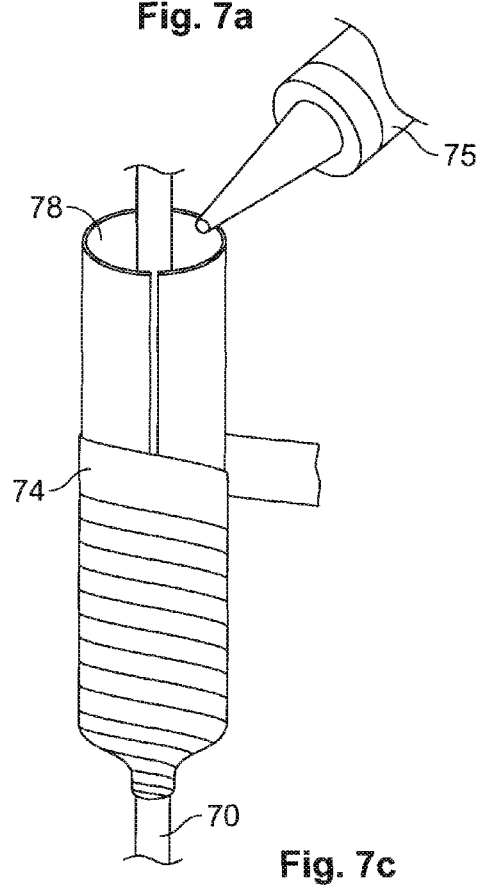
Figure 7D:
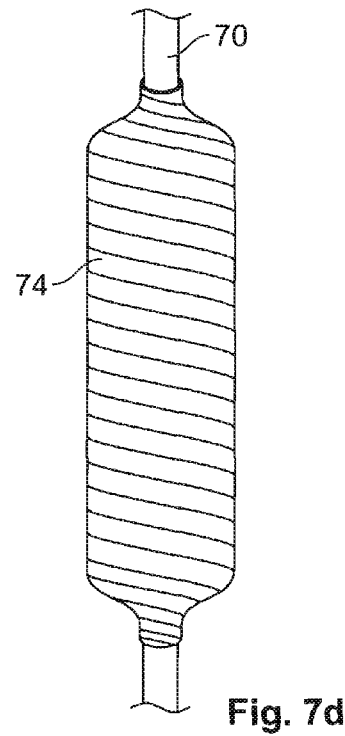

When the injection of adhesive is complete, the casing formed by sheet 78 and winding tape 74 can be completed by winding the tape over the upper end of the casing as seen in FIG. 7c and using it to close off the end of the cavity as shown in FIG. 7d.

When the adhesive has cured in situ, the outer tape and flexible sheet could be stripped off, leaving a cylindrical bead of cured adhesive around the repair, although in most cases it is preferable to leave the wrapped casing in place.

Figure 8A:
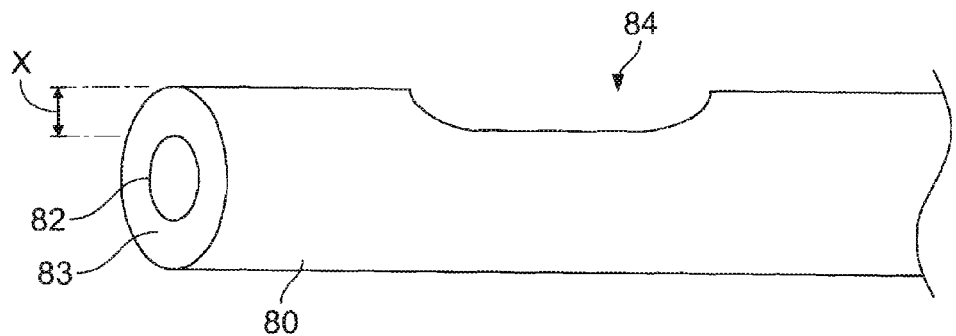
FIGS. 8a to 8d illustrate four stages in the formation of a flush repair of a cable sheath, using a removable tape in accordance with a fourth embodiment of the invention.

FIG. 8 illustrates a repair method according to the invention which can be used to repair a cable having a relatively thick sheath, for example an undersea cable 80 having a sheath 83 which will typically have a thickness X, shown in FIG. 8a, of the order of 1 cm. The cable is shown in FIG. 8a as being damaged and having a cavity 84 in its outer sheath.

Figure 8B:
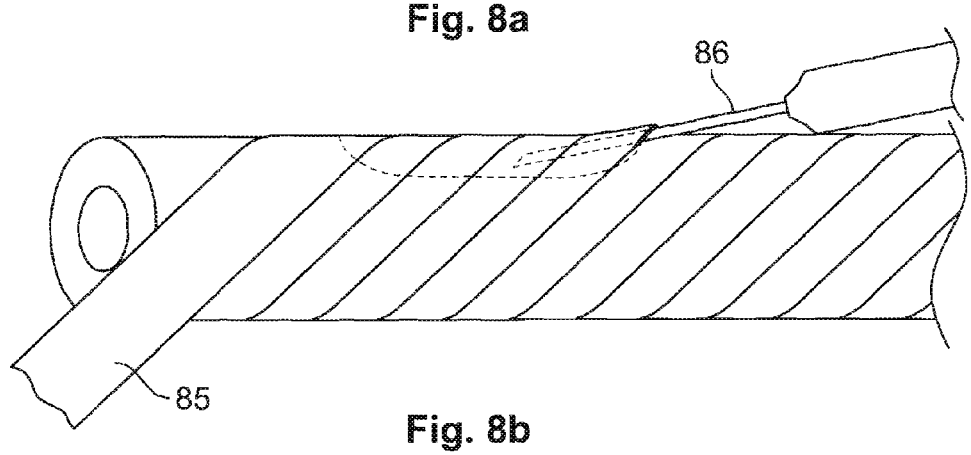

In FIG. 8b, a tape 85, suitably of silicone or another material that does not bond easily to the adhesive being used, is wound around the cable with a cannula, 86 or similar injection device extending into the cavity 84, so that the tape is wound around the cannula. The tape is wound so as to remain flush with the undamaged cable surface and thus does not encroach significantly into the cavity 84.

Figure 8C:
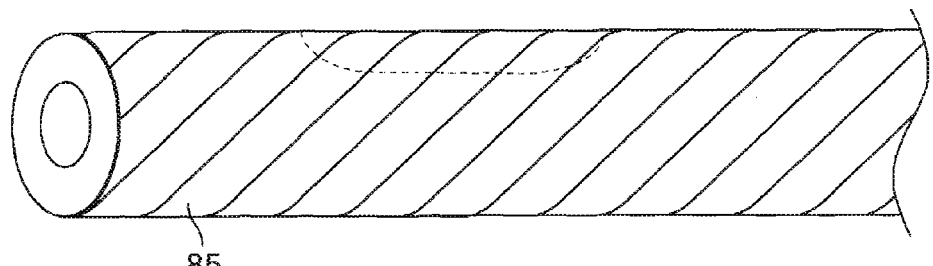

Adhesive is then injected into the cavity, between successive tape windings, to fill it completely, restoring the shape of the cable sheath as shown in FIG. 8c.

Figure 8D:
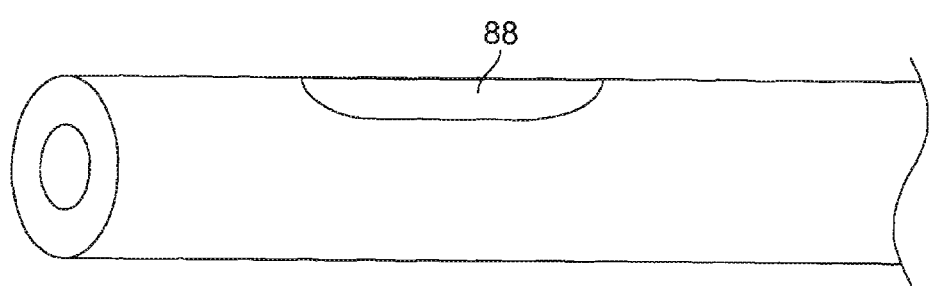

FIG. 8d shows the repaired cable after curing of the injected adhesive 88 and removal of the tape 85. The adhesive has a surface flush with that of the undamaged cable.

In some embodiments of the invention the cavity in the casing may be wholly or partly filled with the uncured adhesive composition prior to final fitting around the cable. For example, in the embodiment of FIG. 4 the cable end 42 could be inserted into the cavity 47, in casing 45 when the cavity is already full or partly full of uncured adhesive.

The adhesive is preferably injected into the cavity from a mixing gun that mixes the two parts of the composition in the desired proportion as they are injected.

The present invention also provides a method of repairing a cable sheath having a cavity therein resulting from the damage, which comprises the steps of winding a tape around the cable at the damaged site to cover said cavity, injecting the curable adhesive through the wound tape into the cavity so as to fill the cavity, curing said adhesive and thereafter removing the tape.

The invention claimed is:

1. A method of repairing or encapsulating a cable, comprising the steps of forming or positioning an enclosure around a part of a cable to be sealed, the enclosure defining within it a cavity, filling the cavity with a two-part structural adhesive composition and allowing said adhesive composition to cure in situ to bond to a surface of said cable, wherein a base resin of the adhesive composition comprises a methacrylate monomer and a minor part comprises an oligomeric synthetic rubber and cure accelerator for the composition.

2. A method according to claim 1, wherein the two parts of the composition are mixed at a volume ratio of 2:1 to 15:1.

3. A method according to claim 1, wherein said methacrylate monomer comprises a methacrylic acid ester of a heterocyclic alcohol.

4. A method according to claim 3, wherein said methacrylate monomer is tetrahydrofurfuryl methacrylate.

5. A method according to claim 1, wherein the base resin component of the composition comprises 40 to 70 weight % of said methacrylate monomer.

6. A method according to claim 1, wherein the base resin component of the composition further comprises a minor amount of an acrylate polymer.

7. A method according to claim 1, wherein the base resin component of the composition further comprises a minor amount of an styrene-butadiene polymer.

8. A method according to claim 6, wherein said base resin component comprises 10 to 30 wt % of said acrylate polymer and 10 to 30 wt % of an acrylonitrile-butadiene styrene resin.

9. A method according to claim 1, wherein the base resin component of the composition has a viscosity of 10 to 25 Pas.

10. A method according to claim 1, wherein the minor component of the composition comprises an organoborane cure accelerator.

11. A method according to claim 10, wherein the cure accelerator comprises an organoborane amine complex.

12. A method according to claim 11, wherein the organoborane-amine complex is carried by one or more polyfunctional aziridines.

13. A method according to claim 1, wherein the oligomeric rubber is a vinyl aromatic compound.

14. A method according to claim 2, wherein the oligomeric rubber is an α-methyl styrene polyurea.

15. A method according to claim 1, wherein the minor part of the composition comprises 40 to 70 wt % of said oligomeric rubber and 10 to 30 wt % of an organoborane curative.

16. A method according to claim 1, wherein the minor part of the adhesive composition has a viscosity of 20 to 35 Pas.

17. A method according to claim 1, wherein the enclosure is formed by a heat shrunk tube.

18. A method according to claim 1, wherein the enclosure defining the cavity for the adhesive is removed after curing of the adhesive.

19. A method according to claim 18, wherein the enclosure is formed by wrapping around the surface of a damaged cable a tape of a material that does not substantially adhere to said adhesive composition, said cavity being formed by a damaged part of a sheath of said cable, and injecting the adhesive composition under the enclosure into said cavity, whereby the adhesive when cured forms a repair flush with the surface of the cable sheath.

20. A method according to claim 1, wherein the adhesive composition is cured at ambient temperature.

21. A method according to claim 1, wherein the oligomeric synthetic rubber is a vinyl aromatic compound.

22. A method of repairing or encapsulating a cable, comprising the steps of forming an enclosure around a part of a cable to be sealed with a heat shrunk tube, the enclosure defining within it a cavity, filling the cavity with a two-part structural adhesive composition and allowing said adhesive composition to cure in situ to bond to a surface of said cable, wherein a base resin of the adhesive composition comprises a methacrylate monomer and a minor part comprises an oligomeric synthetic rubber and cure accelerator for the composition.

* * * * *